3,399,171
FLAME-RESISTANT EPOXY MOLDING AND
COATING COMPOSITIONS
Wilhelm Vogt, Cologne-Sulz, Paul Janssen, Cologne,
Friedrich Kniess, Allner, and Hermann Richtzenhain,
Cologne, Germany, assignors to Dynamit Nobel Aktiengesellschaft, Troisdorf, Germany, a corporation of
Germany
No Drawing. Filed Feb. 23, 1966, Ser. No. 529,243
Claims priority, application Germany, Feb. 26, 1965,
D 46,617
20 Claims. (Cl. 260—47)

This invention relates to epoxy resins. It more particularly relates to hardened epoxy resins which are substantially flame-resistant.

The manufacture of molding and coating compositions having flame-resistant properties is in the prior art. Flame-resistant properties can be achieved, for example, by the use of hardeners containing chlorine or bromine, such as dichloromaleic acid anhydride, tetrachlorphthalic acid anhydride or hetic acid anhydride. The use of epoxy resins containing chlorine or bromine, such as the diglycidyl ether of tetrachloro or tetrabromodiphenylolpropane also resutls in products having flame-resistant properties.

Another proposal for preparing flame-resistant resins consists in the use of additives containing chlorine, bromine, and/or phosphorus, such as triphenylphosphite or tri-β-chloroethyl phosphate. Flame-resistant compositions on a basis of components containing chlorine or bromine require a relatively high chlorine or bromine content. This high halogen compound, however, frequently gives rise to considerable difficulties in fabrication; for example, an epoxy resin prepared from tetrachloro and/or tetrabromodiphenylolpropane and epichlorhydrin has a high viscosity and is therefore substantially more difficult to work than is the corresponding resin prepared from halogen-free diphenylolpropane. It is also known to use phosphoric acid, phosphoric acid halides, acid phosphoric acid esters, esters of phosphorous acid, and phosphonic acids, as hardening agents for epoxy resins. The mechanical characteristics of the compositions obtained with these hardening agents, however, do not meet the necessary requirements, especially because of their increased brittleness.

Another proposal for the manufacture of flame-resistant compositions is in the use of epoxy resins containing phosphorus which have been prepared by the reaction of hydroxyl group-containing epoxides with the halides of phosphoric, phosphonic, or phosphinic acid, and of phosphorous acid. This reaction is very expensive to carry out as it has to be conducted in the presence of solvents and also in the presence of tertiary amines, the resultant amine hydrochlorides having to be removed from the reaction product before use, and also in that the solvent has to be removed from the resultant resins by vacuum distillation.

It is an object of this invention to prepare flame-resistant epoxy resins.

It is another object of this invention to prepare flame-resistant epoxy resins containing phosphorous constituents as the flame retardants.

It is a further object of this invention to prepare flame-retardant epoxy resins in a novel manner.

Other and additional objects of this invention will appear from a consideration of the whole of this specification and the claims appended hereto.

In accordance with the invention, it has now been found that flame-resistant molding and coating compositions having advantageous properties are obtained by partially reacting a polyepoxy compound with a monofunctional acid halide of phosphoric acid containing trivalent or pentavalent phosphorus and thereafter, in a second stage, hardening the partially reacted polyepoxide phosphorus containing compounds thereby obtained with a known hardening agent in the conventional manner.

The phosphorous-halogen compounds employed in accordance with the invention have the following formula:

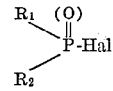

wherein Hal designates halogen, preferably chlorine or bromine, and most preferably chlorine, $R_1$ and $R_2$ are the same or different and represent members of the group of alkyl, aryl, alkaryl, aralkyl, chloralkyl, alkoxy, chloralkoxy, aryloxy or cycloalkyl, and wherein $R_1$ and $R_2$ together represent the group $R_3$, $R_3$ being an alkylene radical having 4 or 5 carbon atoms, an α,ω-dioxyalkyl radical having 2 to 4 carbon atoms or a 1,2-dioxyaryl radical.

The polyepoxy compounds in accordance with the invention are reacted with the above descriptive acid halides in such a manner that no more than one-fourth of the epoxy groups present are converted in the reaction with the acid halides to β-chloroesters of the corresponding phosphoric acids. In this manner the epoxy resins are produced which are liquid at room temperature, easy to work and readily hardened with conventionally hardened agents. The reaction products depending upon the amount of acid halide component used in the reaction contain epoxy groups in addition to one β-chloro-phosphoric acid group or β-chloro phosphorous acid group. As a result of the simultaneous presence of epoxy groups in the resultant molecular of the polyepoxy compounds, the groups containing phosphorus are firmly incorporated in the hardening process so that the fully hardened resins have very good mechanical properties and characteristics. The acid halides of cyclic 6-ring esters of phosphorous acid and phosphoric acid, which can be obtained in a simple manner by the reaction of 1,3-diols with $PCl_3$ or $POCl_3$, respectively, are preferably suited for this reaction with polyepoxy compounds.

Particularly advantageous is the reaction of polyepoxy compounds with those acid halides of phosphorous acid, phosphoric acid, phosphinous acid or phosphinic acid which, in addition to the halogen atom of the acid halide, contain additional halogen atoms, i.e., further chlorine and/or bromine atoms. Examples of suitable compounds which can be used for reaction with polyepoxides of the invention are: monofunctional phosphorous acid chlorides (as, for instance, phosphorous acid diethyl ester chloride, phosphorous acid di-β-chloroethylester chloride, phosphorous acid-di-(β,β,β - trichloromethyl) - ethylester chloride, phosphorous acid - di - (trichloro) - tertbutylester chloride; monofunctional phosphoric acid chlorides (as, for example, phosphoric acid diethylester chloride, phosphoric acid-di-β-chlorethylester chloride, phosphoric acid-di-β-chlorethylester chloride, phosphoric acid-di-(β,β,β-trichloromethyl)-ethylester chloride, phosphoric acid di-(trichloro)-tertbutylester chloride); monofunctional phosphinic acid chlorides (illustrated by diethylphosphinic acid chloride, diphenylphosphinic acid chloride, dibutylphosphinic acid chloride); monofunctional phosphinous acid chlorides (for example, diethylphosphinous acid chloride, dibutylphosphinous acid chloride), and the monofunctional phosphoric acid chlorides of 5-member and 6-member rings, which are derived from the following basic types: phospholane and phospholine, and phosphorinane, respectively, and the corresponding oxo derivatives which are derived from pentavalent phosphorous (such as, 2-chloro-1,3,2-dioxaphospholane,
2-chloro-1,3,2-dioxaphosphorinane,
2-chloro-2-oxo-1,3,2-dioxaphospholane, 2-chloro-2-oxo-1,3,2-dioxaphosphorinane,
2-chloro-6-methyl-1,3,2-dioxaphosphorinane,
2-chloro-2-oxo-6-ethyl-1,3,2-dioxaphosphorinane,
2-chloro-5,5-dimethyl-1,3,2-dioxaphosphorinane,
2-chloro-2-oxo-5,5-dimethyl-1,3,2-dioxaphosphorinane,
2-chloro-5,5-di-(chloromethyl)-1,3,2-dioxaphosphorinane,
2-chloro-2-oxo-5,5-di-(chloromethyl)-1,3,2-dioxaphosphorinane,
2-chlorophospholane,
2-chloro-2-oxophospholane,
2-chloro-4,5-benzo-1,3,2-dioxapholine).

In place of the above-listed phosphoric acid chlorides the corresponding bromine compounds can be used.

The phosphorous acid halides are preferably mixed with polyepoxy compounds in such quantities that the resulting resin contains at least 1.5% phosphorus, which means that, at most, every fourth epoxy group is converted by one of the described acid halide radicals. In the case of compounds which contain halogen in addition to the halide of the acid halide group, the phosphorous content of the modified resin can be reduced below the above-stated amount to achieve the desired flame-resistant properties. In these cases, the reaction of one-eighth to one-tenth of the epoxy groups present may be sufficient.

The reaction of the polyepoxy compounds with the acid halides of phosphoric acid, phosphorous acid, phosphinous acid and phosphinic acid, etc., is carried out at temperatures between 20° C. and 150° C., and preferably at temperatures between 40 and 120° C., depending on the reactivity of the acid halides. When acid chlorides of phosphorous acid and phosphinous acid are used, reaction temperatures between 20° C. and 60° C. may be sufficient. Acid chlorides of phosphoric acid and phosphinic acid require higher temperatures.

The polyfunctional epoxy compounds particularly suitable for the preparation of the phosphorous-modified epoxy addition products in accordance with the invention include the following polyepoxies of polyunsaturated hydrocarbons (vinylcyclohexene, dicyclopentadiene, cyclohexadiene, cyclododecatriene, butadiene, polybutadienes, divinylbenzenes); oligomers of epichlorhydrin and the like; epoxy ethers of polyvalent alcohols (ethyleneglycols, propyleneglycols and butyleneglycols, polyglycols, thiodiglycols, glycerine, pentaerythritol, sorbitol, polyvinyl alcohol, polyallyl alcohols, etc); epoxy ethers of polyvalent phenols (resorcinol),
hydroquinone,
bis-(4-oxyphenyl)-methane,
bis-(4-oxy-3-methylphenyl)-methane,
bis-(4-oxy-3,5-dichlorophenyl)-methane,
bis-(4-oxy-3,5-dibromophenyl)-methane,
bis-(4-oxy-3,5-difluorophenyl)-methane,
1,1,bis-(4-oxyphenyl)-ethane,
2,2-bis-(4-oxyphenyl)-propane,
2,2-bis-(4-oxy-3-methylphenyl)-propane,
2,2-bis-(4-oxy-3-chlorophenyl)-propane,
2,2-bis-(4-oxy-3,5-dichlorophenyl)-propane,
bis-(4-oxyphenyl)-phenylmethane,
bis-(4-oxyphenyl)-diphenylmethane,
bis-(4-oxyphenyl)-4'-methylphenylmethane,
1,1-bis-(4-oxyphenyl)-2,2,2-trichlorethane,
bis-(4-oxyphenyl)-4-(chlorphenyl)-methane,
1,1-bis-(4-oxyphenyl)-cyclohexane,
bis-(4-oxyphenyl)-cyclohexylmethane,
4,4'-dioxydiphenyl,
2,2'-dioxydiphenyl,
4,4'-dioxydiphenylsulfone and the oxyethylethers and phenol-formaldehyde condensation products thereof) and also the polyepoxy compounds which have been made by prior art methods from poly-unsaturated carboxylic acids or mono-unsaturated carboxylic acid esters of unsaturated alcohols; glycidyl esters of poly-basic carboxylic acids, polyglycidyl esters which can be obtained by the polymerization or copolymerization of glycidyl esters of unsaturated acids, or of other acid compounds (cyanuric acid and cyclic trimethylene trisulfone or their derivatives, etc.).

It may prove advantageous in certian instances to carry out the preparation of the phosphorous-modified epoxy products in the presence of solvents.

Both basic and acid hardening agents as known in the art can be used to harden these phosphorous-modified epoxy addition products. The hardening can also be conducted with the known catalytically acting hardeners. The hardening is carried out at the hardening temperatures characteristic of the known hardening agents. In some cases it may prove advantageous to use the epoxy resins, modified as described, in the dissolved form as, for instance, dissolved in triethyleneglycol, in order to harden them. The hardening time of the flame-resistant molding and coating compositions of the invention can be shortened, if desired, by the addition of a conventional hardening accelerator.

The hardening reaction suitably takes advantage of accelerators such as phenols: particularly, aminophenols, alcohols, polyols, mercaptans, thio-ethers, dithio-ethers, sulfoxides, Lewis acids, diamines, diamides and other nitrogen-carbon-sulfur compounds generally known as epoxy resin hardening accelerators.

The compositions resulting from the hardening of the phosphorous-modified epoxy addition products can be used to special advantage, on account of their high phosphorous and chlorine content, wherever non-combustible casting resins (in the electrical industry, for example) and non-combustible varnishes are required.

The following examples are furnished by way of illustration and it is not intended that they be taken as limitative in any way of the scope of the invention:

EXAMPLE 1

100 g. 2-chloro-1,3,2-dioxapholane were introduced drop by drop with agitation at 40° C. over a period of 2 hours into 600 g. of a diglycidyl ether of 2,2-bis-(4-oxyphenyl)-propane having an epoxide value of 0.53 per 100 g. resin. The reaction temperature was maintained at 40° C. throughout this addition, by cooling the mixture. The mixture thereby formed was agitated for another 2 hours at the same temperature.

After completion of the reaction, ionogenic chloride could no longer be detected by alcoholic hydrolysis. An epoxy resin was obtained which was liquid at room temperature and has a phosphorous content of 3.53% and a chloride content of 4.0%. The phosphorous epoxy resin addition product had an epoxy value of 0.41 per 100 g. of resin.

100 g. of the phosphorous epoxy resin addition product thus produced were hardened at room temperature to form a solid resin using 22 g. bis-(γ-aminopropoxy)-butane as hardening agent. The hardening time was 90 minutes. The hardened resin exhibited flame-resistant properties and had a phosphorous content of 2.9% and a chlorine content of 3.3%.

EXAMPLE 2

153 g. 2 - chloro - 4 - methyl-1,3,2-dioxaphosphorinane were added at 40–60° C. over a period of 3 hours, and with agitation, to 1293 g. of a diglycidyl ether of 2,2-bis-(4-oxyphenyl)-propane having an epoxy value of 0.53 per 100 g. resin. The reaction temperature was held to 60° C. throughout the addition. Stirring of the mixture was continued at the same temperature for another 5 hours. An epoxy resin was obtained which was liquid at room temperature, and which had a phosphorous content of 2.14, a chlorine content of 2.45% and an epoxy value of 0.44 per 100 g. resin. 150 g. of this phosphorous epoxy addition product were then hardened at room temperature with 35 g. of bis-(γ-aminopropoxy)-butane over a period of 85 minutes. The hardened resin exhibited flame-resistant properties, had a phosphorous content of 1.74% and a chlorine content of 2.07%.

150 grams of the phosphorous addition product were hardened with 16 g. triethylene-tetramine under the same conditions but over a period of 60 minutes. The phosphorous content of the resin amounted to 1.93%, and the chlorine content to 2.2%.

After annealing for 10 hours at 60° C., the products which has been hardened with bis-($\gamma$-amino-propoxy)-butane and triethylenetetramine had the following mechanical properties:

|  | Hardened with bis-($\gamma$-aminopropoxy)-butane | Hardened with triethylene-tetramine |
|---|---|---|
| Tensile strength (kg./cm.$^2$) | 805 | 517 |
| Bending strength (kg./cm.$^2$) | 1,158 | 1,026 |
| Impact strength (cm.-kg./cm.$^2$) | 48 | 15 |
| Hardness (kg./cm.$^2$) | 1,098–1,027 | 1,326–1,273 |
| Vicat value (0° C.) | 65 | 105 |
| Water absorption, percent (1 hr. 100° C.) | 1.81 | 1.06 |

EXAMPLE 3

950 g. of a diglycidyl ether of 2,2-bis-(4-oxyphenyl)-propane having an epoxy value of 0.53/100 g. resin, were reacted as described in Example 2 with 168.5 g. 2-chloro-5,5-dimethyl-1,3,2-dioxaphosphorinane. An epoxy resin was obtained which was liquid at room temperature and which has a phosphorous content of 2.77%, a chlorine content of 3.18%, and an epoxy value of 0.358 per 100 g. resin.

150 g. of the latter phosphorous epoxy addition product were hardened into a solid resin at room temperature in 80 minutes with 28 g. bis-($\gamma$-aminopropoxy)-butane. The hardened resin was then annealed at 60° C. for 10 hours. In an analogous manner, a diglycidyl ether of 2,2-bis-(4-oxyphenyl)-propane, adjusted to the same phosphorous content of 2.77% by mixing with tris-($\beta$-chlorethyl)-phosphate, was hardened at room temperature with bis-($\gamma$-amino-propoxy)-butane, and thereafter annealed for 10 hours at 60° C.

The mechanical characteristics of the two hardened products differ substantially, as shown in the following table:

|  | Mixture of epoxy resin and tris-($\beta$-chlorethyl)-phosphate | Phosphorous epoxy addition product of the invention |
|---|---|---|
| Tensile strength (kg./cm.$^2$) | 284 | 764 |
| Bending strength (kg./cm.$^2$) | 372 | 1135 |
| Hardness (kg./cm.$^2$) | 461–325 | 1224–1179 |
| Vicat value (° C.) | (¹) | 93 |
| Water absorption, percent (1 hr., 100° C.) | 1.45 | 1.86 |

¹ Not measurable.

EXAMPLE 4

420 g. phosphorous acid-di-(trichloro)-tertbutylester chloride were added drop-by-drop over a 5 hour period at 60° C. with agitation, to 1140 g. of a diglycidyl ether prepared from 2,2-bis-(4-oxyphenyl)-propane having an epoxy value of 0.53 per 100 g. resin. The reaction was continued at the same temperature for another 5 hours. A liquid, phosphorous epoxy resin was obtained, having a phosphorous content of 1.99 and a chlorine content of 16%. The resin had an epoxy value of 0.32 per 100 g. resin.

160 g. of the phosphorous epoxy addition product as just obtained were hardened at room temperature in 40 minutes with 13 g. triethylenetetramine. The resin exhibited flame-resistent characteristics, had a phosphorous content of 1.84 and a chlorine content of 14.8%.

Following 10 hours of annealing at 60° C., the hardened resin possessed the following mechanical properties:

Tensile strength (kg./cm.$^2$) _____ 402
Bending strength (kg./cm.$^2$) _____ 947
Impact strength (cm.-kg./cm.$^2$) _____ 7.9
Hardness (kg./cm.$^2$) _____ 1273–1224
Vicat value (° C.) _____ 91
Water absorption, percent (1 hour, 100° C.) _ 0.57

EXAMPLE 5

950 g. of a diglycidyl ether of 2,2-bis-(4-oxyphenyl)-propane having an epoxy value of 0.53 per 100 g. resin were mixed with 184.5 g. 2-chloro-2-oxo-5,5-dimethyl-1,3,2-dioxaphosphorinane and the mixture heated with agitation at 150° for 5 hours. A phosphorous-modified epoxy resin was obtained, which was liquid at room temperature and had an epoxy value of 0.32 per 100 g. resin. 150 g. of this epoxy addition product were hardened to a solid resin at room temperature in 40 minutes using 29 g. bis-($\gamma$-aminopropoxy)-butane as hardener. After 10 hours of tempering at 60° C., the hardened resin had the following mechanical characteristics:

Tensile strength (kg./cm.$^2$) _____ 528
Bending strength (kg./cm.$^2$) _____ 1072
Impact strength (cm.-kg./cm.$^2$) _____ 9.5
Hardness (kg./cm.$^2$) _____ 1098–1027
Vicat value (° C.) _____ 76
Water absorption, percent (1 hr. 100° C.) _____ 1.83

EXAMPLE 6

150 g. of the phosphorous-modified epoxy addition product prepared, as set out in Example 5, and having an epoxy value of 0.32 per 100 g. resin, were hardened with 98 g. of a mono-chlorophthalic acid anhydride mixture consisting of 3- and 4-monochlorophthalic acid anhydride in a molar ratio of 1:1 and 1.5 g. of 2,4,6-tris-(dimethylamino)-phenol at 120° C. over 45 minutes to form a resin having flame-resistant properties. After 10 hours of annealing at 60° C., the hardened resin had the following mechanical characteristics:

Tensile strength (kg./cm.$^2$) _____ 343
Bending strength (kg./cm.$^2$) _____ 1095
Impact strength (cm.-kg./cm.$^2$) _____ 8.6
Hardness (kg./cm.$^2$) _____ 1447–1384
Vicat value (° C.) _____ 170
Water absorption, percent (1 hr. 100° C.) _____ 0.24

EXAMPLE 7

A mixture of 1140 g. of a diglycidyl ether of 2,2-bis-(4-oxyphenyl)-propane and 242 g. of di-($\beta$-chlorethyl)-phosphoric acid chloride was heated for 5 hours with agitation at 150° C. An epoxy resin was thereby obtained which was liquid at room temperature and had an epoxy value of 0.36 per 100 g. resin, a phosphorous content of 2.27 and a chlorine content of 7.77%.

150 g. of the above said epoxy addition product were hardened with 100 g. of a mono-chlorophthalic acid anhydride mixture consisting of 3- and 4-monochlorophthalic acid anhydride in a molar ratio of 1:1 in the presence of 1.5 g. 2,4,6-tris-(dimethylamino)-phenol, at 120° C. in 75 minutes. The hardened resin exhibited flame-resistant properties. After annealing for 10 hours at 60° C., the hardened resin had the following mechanical properties:

Tensile strength (kg./cm.$^2$) _____ 527
Bending strength (kg./cm.$^2$) _____ 1112
Impact strength (cm.-kg./cm.$^2$) _____ 14.0
Hardness (kg./cm.$^2$) _____ 1326–1273
Vicat value (° C.) _____ 123
Water absorption, percent (1 hr. 100° C.) _____ 0.36

We claim:
1. The process of producing a hardened flame-resistant resin which comprises reacting a polyepoxy compound having a plurality of 1,2-epoxide groups with a phosphoric acid halide having the formula:

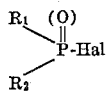

wherein Hal is halogen and each of $R_1$ and $R_2$ is a member selected from the group consisting of alkyl, aryl, aralkyl, alkaryl, chlor-alkyl, alkoxy, chloralkoxy, aryloxy, and cycloalkyl, and wherein $R_1$ and $R_2$ together represent the group $R_3$ wherein $R_3$ is selected from the group consisting of alkylene of from 4 to 5 carbon atoms, $\alpha$-$\omega$-dioxyalkylene of from 2 to 4 carbon atoms and 1,2-dioxyaryl to form a partial reaction product having at least one-tenth of the epoxy groups present therein reacted containing epoxy groups, and thereafter hardening said partial reaction product.

2. Process according to claim 1, which comprises effecting said reaction of said polyepoxy compound and phosphoric acid halide so that at the most one-fourth of the epoxy groups present in said polyepoxy compound are reacted.

3. Process according to claim 1, which comprises effecting said reaction of said polyepoxy compound and phosphoric acid halide so that at the most one-fourth but at the least one-tenth of the epoxy groups present in said polyepoxy compound are reacted.

4. Process according to claim 1, which comprises reacting said polyepoxy compound and said phosphoric acid held at a temperature of from 20 to 150° C.

5. Process according to claim 1, which comprises reacting said polyepoxy compound and said phosphoric acid held at a temperature of from 40 to 120° C.

6. Process according to claim 1, wherein said phosphoric acid halide is a member selected from the group consisting of acid chlorides of phosphorous acid and phosphinous acid, and said reaction with said polyepoxy compound is effected at a temperature between 20 and 60° C.

7. Process according to claim 1, wherein said reaction of said polyepoxy compound and phosphoric acid halide is effected in the presence of a solvent.

8. Process according to claim 1, wherein said hardening agent is a member selected from the group consisting of aminophenols, monoalcohols, polyalcohols, mercaptans, thioethers, dithioethers, sulfoxides, Lewis acids, diamines, and diamides.

9. Process according to claim 1, wherein said hardening agent is bis-($\gamma$-aminopropoxy)-butane.

10. Process according to claim 1, wherein said hardening agent is triethylenetetramine.

11. Process according to claim 1, wherein said hardening agent is a mixture of 3- and 4-monochlorophthalic acid anhydrides in a molar ratio of 1:1 with 2,4,6-tris-(dimethylamino)-phenol.

12. Process according to claim 1, wherein said polyepoxy compound is a diglycidyl ether of 2,2-bis-(4-oxyphenyl)-propane.

13. Process according to claim 1, wherein said phosphoric acid halide is 2-chloro-1,3,2-dioxaphospholane.

14. Process according to claim 13, wherein said phosphoric acid halide is 2-chloro-4-methyl-1,3,2-dioxaphosphorinane.

15. Process according to claim 13, wherein said phosphoric acid halide is 2-chloro-5,5-dimethyl-1,3,2-dioxaphosphorinane.

16. Process according to claim 13, wherein said phosphoric acid halide is phosphorous acid-di-(trichloro)-tert. butyl ester chloride.

17. Process according to claim 13, wherein said phosphoric acid halide is 2-chloro-2-oxo-5,5-dimethyl-1,3,2-dioxaphosphorinane.

18. Process according to claim 13, wherein said phosphoric acid halide is di-($\beta$-chlorethyl)-phosphoric acid chloride.

19. The flame-resistant epoxy resin of claim 1.
20. The flame-resistant epoxy resin of claim 2.

References Cited
UNITED STATES PATENTS
3,310,503   3/1967   Huwyler et al. _____ 260—47

WILLIAM H. SHORT, *Primary Examiner.*
T. D. KERWIN, *Assistant Examiner.*